United States Patent
Berstecher et al.

(10) Patent No.: US 7,032,959 B2
(45) Date of Patent: Apr. 25, 2006

(54) LATERAL WALL MODULE FOR THE BODY OF A MOTOR VEHICLE

(75) Inventors: Uwe Berstecher, Boeblingen (DE); Lutz Gutjahr, Achim (DE); Arnold Rohlfs, Ganderkesee (DE); Karlheinz Schurer, Gaeufelden (DE); Karl Wollensak, Eutingen (DE)

(73) Assignee: DaimlerChrysler AG, Stuttgart (DE)

( * ) Notice: Subject to any disclaimer, the term of this patent is extended or adjusted under 35 U.S.C. 154(b) by 3 days.

(21) Appl. No.: 10/492,842

(22) PCT Filed: Aug. 30, 2002

(86) PCT No.: PCT/EP02/09733

§ 371 (c)(1),
(2), (4) Date: Oct. 8, 2004

(87) PCT Pub. No.: WO03/035453

PCT Pub. Date: May 1, 2003

(65) Prior Publication Data
US 2005/0035630 A1 Feb. 17, 2005

(30) Foreign Application Priority Data
Oct. 19, 2001 (DE) ............................... 101 51 684

(51) Int. Cl.
B60J 7/00 (2006.01)
(52) U.S. Cl. .............................. 296/193.05; 296/203.03
(58) Field of Classification Search .......... 296/193.05, 296/203.03, 193.06
See application file for complete search history.

(56) References Cited

U.S. PATENT DOCUMENTS 3,541,668 A * 11/1970 Schuld et al. .......... 296/193.01

(Continued)

FOREIGN PATENT DOCUMENTS

| DE | 19531874 C1 | 10/1996 |
|----|-------------|---------|
| DE | 10001316 A1 | 7/2001 |
| EP | 1024073 A1 | 8/2000 |
| LU | 34850 | 12/1956 |

OTHER PUBLICATIONS

Copy of German office action with partial English translation.

Primary Examiner—Kiran B. Patel
(74) Attorney, Agent, or Firm—Crowell & Moring LLP

(57) ABSTRACT

The invention relates to a lateral wall module for the body of a motor vehicle and to a method for its production. The lateral wall module extends to the rear in the longitudinal direction of the vehicle at least from an A-pillar as far as a rear wheel mounting, and has a lateral wall structure and also a lateral wall panel connected to the latter, the lateral wall structure, for its part, being constructed from an inner part and a wall part, which is fastened on the outside of the inner part and integrally reinforces the lateral wall module, and is at least partially designed in the sill region in such a manner that it complements the lateral wall panel there. In order to use the lateral wall module in a simple manner for a convertible or a coupe, it is proposed that the lateral wall panel is designed as a single-component pressed part which extends from the rear wheel mounting, firstly, over the lateral roof frame and the A-pillar as far as the front wall pillar and, secondly, over a sideboard as far as the box-section pillar, that the box-section pillar of the lateral wall module runs as far as the upper edge of the sideboard, and that the lateral wall panel and the lateral wall structure are designed in profile form in the manner of an open loop, the openings of the loops facing each other in the assembled state.

8 Claims, 2 Drawing Sheets

U.S. PATENT DOCUMENTS

| | | | | |
|---|---|---|---|---|
| 3,724,153 A | * | 4/1973 | Wessells et al. | 296/203.03 |
| 4,960,974 A | * | 10/1990 | Shigenaka | 219/137 R |
| 5,246,264 A | * | 9/1993 | Yoshii | 296/193.05 |
| 5,785,378 A | * | 7/1998 | Seefried et al. | 296/193.05 |
| 5,836,641 A | * | 11/1998 | Sugamoto et al. | 296/187.05 |
| 5,938,275 A | * | 8/1999 | Kleinhans et al. | 296/203.03 |
| 6,073,992 A | * | 6/2000 | Yamauchi et al. | 296/203.01 |
| 6,254,172 B1 | * | 7/2001 | Takahara | 296/203.03 |
| 6,390,539 B1 | * | 5/2002 | Takahara | 296/187.05 |
| 6,464,290 B1 | * | 10/2002 | Schwarz et al. | 296/203.03 |
| 6,709,045 B1 | * | 3/2004 | Shuto et al. | 296/203.03 |
| 6,722,729 B1 | * | 4/2004 | Yoshida et al. | 296/203.02 |
| 2002/0043821 A1 | * | 4/2002 | Takashina et al. | 296/203.03 |
| 2003/0102697 A1 | * | 6/2003 | Yakata et al. | 296/209 |

\* cited by examiner

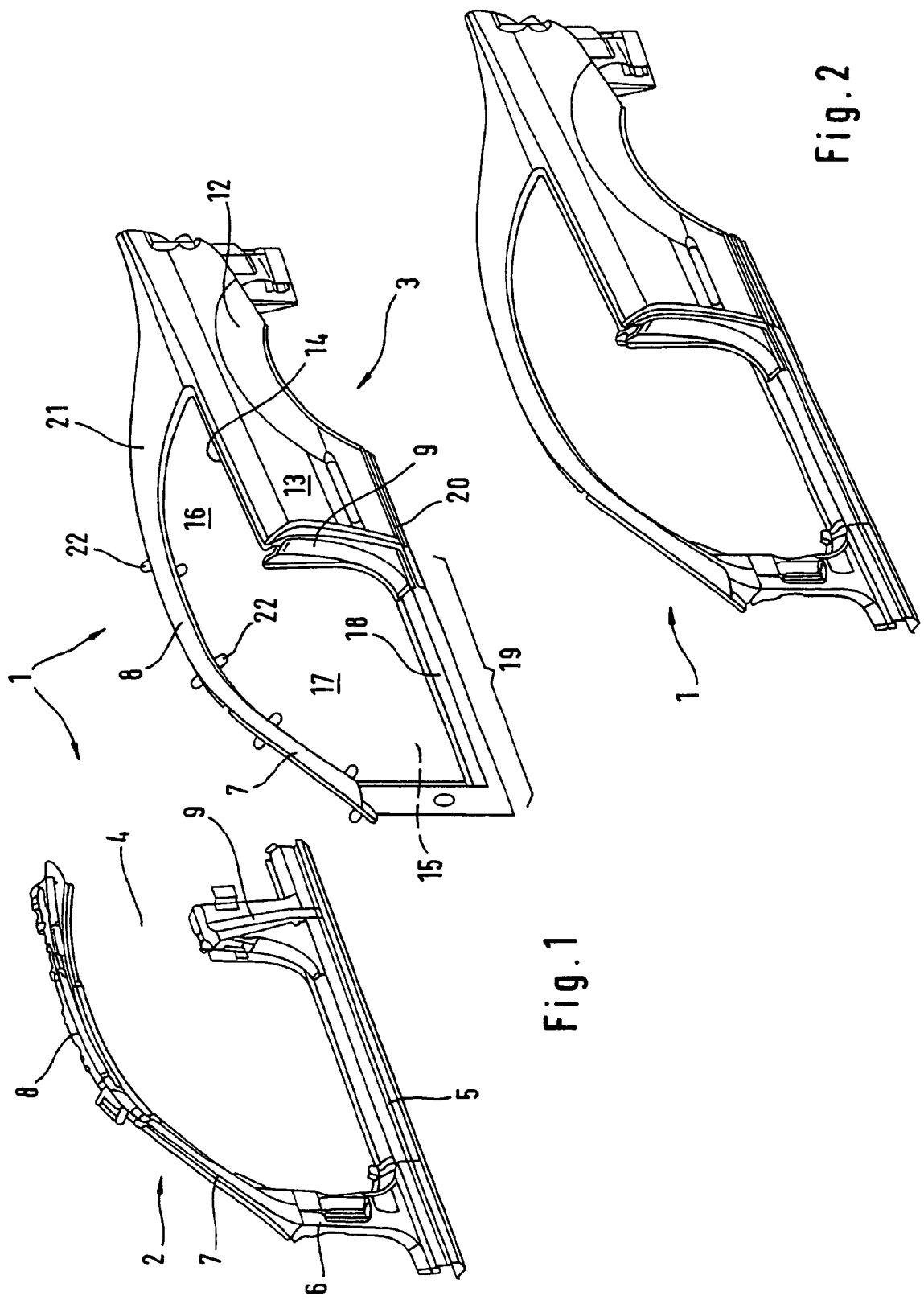

LATERAL WALL MODULE FOR THE BODY OF A MOTOR VEHICLE

BACKGROUND AND SUMMARY OF THE INVENTION

This invention relates to a lateral wall module for the body of a motor vehicle and to a method for its production.

A lateral wall module of this type and a method of this type are disclosed in German document DE 195 31 874 C1. This document describes a lateral wall module for use in sedans, which module is composed, according to FIG. 2b, of a panel part and a multi-part lateral wall structure. The lateral wall structure is basically formed by an inner part and a wall part which is fastened on the outside of the inner part and integrally reinforces the lateral wall module. The inner part comprises, as separate components, the C-pillar, the wheel mounting with a sill section stretched forward and a lateral roof frame section and also the front door cutout with the A-pillar, a front wall pillar, the B-pillar, the rest of the lateral roof frame and the rest of the sill. In terms of shape, the reinforcing part is essentially adapted from the front door cutout, the reinforcing part additionally extending over the entire sill region. The sill and also the B-pillar are without paneling and it is their surfaces themselves which form the outer skin of the body which is optically visible to the outside in this region. The panel stretches from the rear wheel mounting over the C-pillar and the lateral roof frame as far as the front wall pillar, an attachment for the B-pillar being formed on the lateral roof frame.

In convertibles and coupes, the panel part is divided in two, with, for reasons concerned with the inherent stability of the lateral roof frame, which is very thin in comparison with sedans, the A-pillar section of the part being designed as a separate component in the form of a cover. The cover is clipped to the reinforcing part of the lateral wall structure and is supported on that part by means of a pad. Since the cover generally consists of a colored plastic, annoying color differences from the paintwork of the rest of the panel undesirably occur from time to time. Furthermore, the cover is generally associated with manufacturing tolerances, which results in different gap widths toward the adjoining, lateral roof frame. In order to remedy this, serious and complicated refinishing operations are necessary.

One object of the invention is the object of developing a lateral wall module of the type mentioned and a method of the type mentioned for producing it to the effect that the lateral wall module can be used in a simple manner for a convertible or a coupe.

This object is achieved according to the invention by the claimed features.

Owing to the fact that the lateral panel is of integral design and the A-pillar cover which is otherwise customary in convertibles and coupés is therefore unnecessary, the design of the lateral wall module is considerably simplified. This is all the more the case since a B-pillar strut is not provided either in the lateral wall structure or in the panel, and the lateral wall structure merely comprises the sill region, the A-pillar and the lateral roof frame as far as the C-pillar. Furthermore, it is not necessary to make special demands in respect of the surface quality of the box-section pillar of the lateral wall structure, since the panel takes on this part, which means that the lateral wall structure can be designed more simply. The particular design of the lateral wall structure, on the one hand, and of the panel, on the other hand, in the manner of open loops substantially simplifies the design and production of the door and window openings.

A solution according to the invention also makes the production easier to the effect that, by the cover which was previously a separate part of the panel becoming unnecessary, firstly color differences between the cover and rest of the panel no longer occur and, secondly, manufacturing tolerances of the cover which have led to different gap widths between the cover and the lateral roof frame of the panel no longer have to be refinished. Furthermore, the use at the same time of an auxiliary frame confers the necessary inherent stiffness on the panel provided with the relatively thin, lateral roof frame, with the result that, after the panel has been cut in order to form door and window openings, irreversible distortions of the panel part, in particular in the roof frame region and an elastic spring rebound of the sheet-metal material of the panel, which can make it impossible to join the panel to the lateral wall structure, do not occur when the panel is removed from the pressing tool. Furthermore, the omission of the cover affords the advantage that the A-pillar, which is an obstacle to an unrestricted freedom of view for the driver, can be made narrower, since the clipping technique with which the cover is held on the structure, and also a supporting pad between the cover and the outer reinforcing shell of the structure are unnecessary. As a result, the obstruction of the driver's view which is caused by the A-pillar is reduced, with it not being necessary at the same time to concede any losses in stiffness of the A-pillar and therefore in safety during a crash.

Expedient refinements of the invention can be gathered from the dependent claims; moreover, the invention is explained in greater detail below with reference to an exemplary embodiment which is illustrated in the drawings.

BRIEF DESCRIPTION OF THE DRAWINGS

FIG. 1 shows, in a perspective view, a lateral wall structure and a lateral wall panel of the lateral wall module according to the invention before assembly, FIG. 2 shows, in a perspective view, the lateral wall structure and the lateral wall panel of FIG. 1 after assembly and cutting.

DETAILED DESCRIPTION OF THE INVENTION

Figure 3:
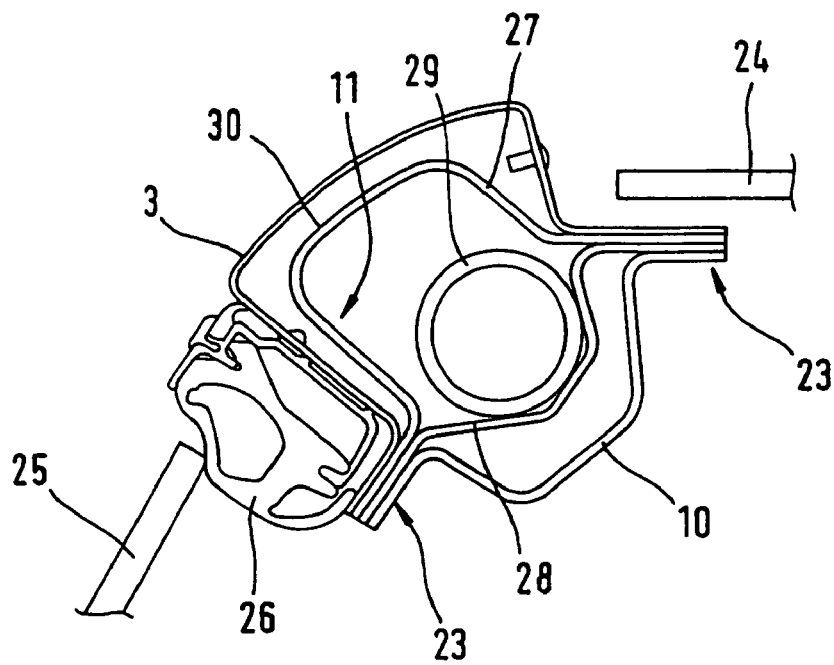
FIG. 3 shows, in a plan view, a cross section of an A-pillar of the lateral wall module of FIG. 2.

FIGS. 1 and 2 illustrate a lateral wall module 1 for the body of a motor vehicle, the module containing a lateral wall structure 2 and a lateral wall panel 3 connected to the latter. In its profile form, the lateral wall structure 2 is designed in the manner of an open loop, in this exemplary embodiment a three-quarter loop with an opening 4 toward the vehicle rear, and is composed of a sill 5, a front wall pillar 6, an A-pillar 7 adjoining the latter, a lateral roof frame 8 and a box-section pillar 9 joined to the sill 5. The lateral wall structure 2 is constructed from an inner part 10 (FIG. 3) and a wall part 11 which is fastened on the outside of the inner part 10 and integrally reinforces the lateral wall module 1. The wall part is designed as a hollow profile in a shell-type construction, so that a high stiffness is obtained, which has a very advantageous effect in terms of safety during a crash.

Owing to their fissured profiling, the inner part 10 and wall part 11 have an inherent stiffness which prevents the parts from being distorted after the deep-drawing process. The wall part 11 and the inner part 10 can therefore be readily connected, in particular attached, to each other provisionally in the direction transverse with respect to the longitudinal direction of the vehicle, in a first step of producing the lateral wall module 1.

The use of the solution according to the invention is also conceivable in the case of sedans, the loop merely relating to the driver's door opening and the front wall pillar 6 and/or the sill region situated below the driver's door opening with the panel 3 being left open.

The lateral wall panel 3 is designed as a single-component pressed part which extends from the rear wheel mounting 12, firstly over the lateral roof frame 8 and the A-pillar 7 as far as the front wall pillar 6 and, secondly, over a sideboard 13, the upper edge 14 of which forms the lower end of a window opening, as far as the box-section pillar 9. In this case, the upper edge 14 ends flush with the box-section pillar 9. The lateral wall panel 3 is designed in the same manner as the lateral wall structure 2 in the profile form in the manner of an open loop, but with the opening 15 directed toward the front of the vehicle.

In the assembled state of the lateral wall panel 3 and lateral wall structure 2, the openings 15 and 4 of the loops face each other, the loops partially overlapping in the longitudinal direction of the vehicle. In this case, the lateral wall structure 2 is designed in the sill region as far as the box-section pillar 9 in such a manner that it complements the lateral wall panel 3 there (FIG. 2). In a second step of producing the lateral wall module 1, which step can take place in parallel with the first one, the lateral wall panel 3, which extends from the rear wheel mounting 12 over the lateral roof frame 8 and the A-pillar 7, is deep drawn from a blank and is cut with a window opening 16 and a door opening 17 being formed. The door opening 17 and the window opening 16, which is situated above the sideboard 13 of the lateral wall panel 3, merge into each other without any interruption. Although, in the assembled state, the lateral wall panel 3 is designed as an open loop, it has, after the abovementioned cutting process, an auxiliary frame 18 which, in place of the front wall pillar 6 and the sill section 19 running below the door opening 17, connects the panel part of the A-pillar 7 and that of the rest of the sill 20 adjoining the door opening 17 to each other. The auxiliary frame 18 prevents, after the cutting process, the relatively thin, long stretched-out panel arc, which is composed of the lateral roof frame 8 and the A-pillar 7 and the C-pillar 21, from distorting in an uncorrectable manner as it is being removed from the pressing tool, which would mean that the lateral wall panel 3 is no longer able to be joined to the structure 2.

It is conceivable as the next production step, with the prerequisite that the auxiliary frame 18 is designed in a simple manner in terms of production as an angular sheet-metal section, for the lateral wall panel 3 to have to be fixed rigidly in a clamping device in order to separate the auxiliary frame 18 from the panel in the fixed state, so that the subsequent joining process can take place without obstruction. The clamping requires retaining tabs 22 which are arranged along the panel arc and are formed at the same time as the panel 3 is cut after the deep-drawing process. After a preliminary joining process of the panel 3 to the lateral wall structure 2, which joining process is executed in the form of an attachment process, the retaining tabs are severed, in particular like the auxiliary frame 18 are also cut away by means of a laser.

As an alternative to this, it is furthermore conceivable to design the deep-drawing process or the deep-drawing tool in such a manner that the auxiliary frame 18 is not formed as a vertical angular sheet but rather protrudes laterally outward in the transverse direction of the vehicle, with the result that the auxiliary frame no longer gets in the way when the panel 3 is assembled together with the structure 2. With this refinement, a sufficient stiffness of the panel 3 is likewise ensured. The production of the panel 3 is therefore simplified, since the retaining tabs 22 and therefore the special cutting of the panel pressed part and the subsequent severing of the retaining tabs 22 can be omitted. Furthermore, a complicated clamping device can be dispensed with, since the panel 3, including the auxiliary frame 18, is joined directly to the lateral wall structure 2 or is firstly attached to start with and is then joined. The auxiliary frame 18 may subsequently be severed from the panel 3, since it is no longer necessary owing to those sections of the panel which are prone to distortion having been fixed in place by the assembly. However, a laser cutting device which can be guided three-dimensionally is required, so that the lateral wall structure 2 situated behind the panel 3 is not damaged during the cutting.

Finally, the panel 3 is joined to the lateral wall structure 2. This may take place by means of bonding connections, for which purpose the panel 3 and the structure 2 have corresponding connecting flanges 23 which are then jointly bonded to each other. These are shown by way of example in FIG. 3 on the A-pillar 7. In addition to a windshield 24 and a side window 25 and also a seal 26 for the A-pillar section of the panel 3, the two half shells 27, 28 of the reinforcing wall part 11, which half shells are covered by said panel 3, the inner part 10 of the structure 2 and furthermore a reinforcing pipe 29, which is arranged in the hollow profile formed by the half shells 27, 28 and runs toward the vehicle floor, can be seen. The flanges 23 which rest on each other are situated, on the one hand, behind the seal 26 in the manner such that they are not visible to the outside and, secondly, behind the edge region of the windshield 24. Owing to the omission of the clip connection of the cover and of the supporting pad which were arranged on the outside 30 of the outer half shell 27, the panel which is used in place of the cover can be guided more closely along the outside 30 of the half shell 27, so that the A-pillar has a visually narrower effect and also leads functionally to a reduced angle of obstruction of the driver's view.

Figure 4:
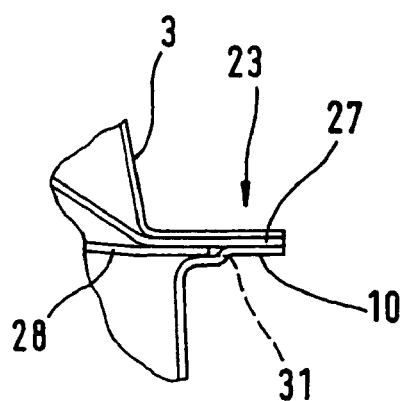
FIG. 4 shows, in a detail, a cross section of connecting flanges of the lateral wall module in the A-pillar region according to FIG. 3.
Figure 5:
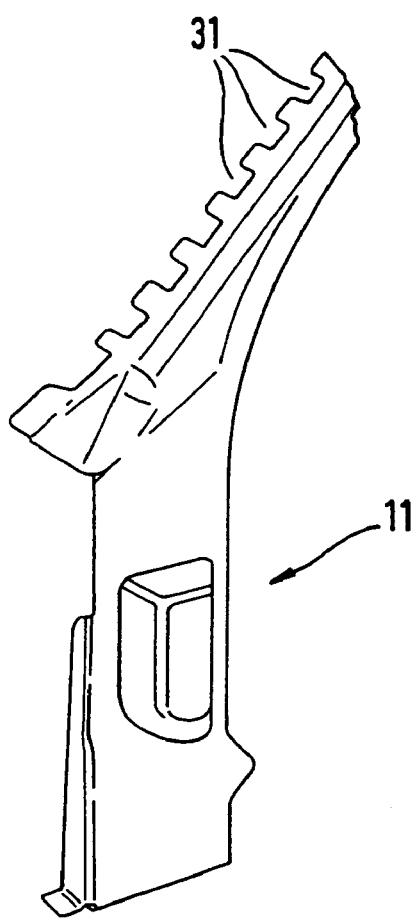
FIG. 5 shows, in a perspective view, part of a reinforcing wall part of the lateral wall structure in the A-pillar region and front wall pillar region of FIG. 1.

One variant to bonding connections is in the formation of welding connections, in particular of spot welding connections which can normally be executed with a very small outlay in terms of technology. However, these are no longer readily possible due to the four-layer nature of the connecting flanges 23 resting on one another. The connecting flanges 23 have a multiplicity of notches 31 (FIGS. 4 and 5) for this purpose. The notches 31 may relate to the flanges of the half shells 28, in which case the inner part 10 of the structure 2 is pushed upward at this point to abut flat against the lower side of the half shell 27. However, it may equally be the case that the notches 31, which are arranged at a regular distance along the connecting flanges 23, are formed exclusively on the inner part 10 of the structure. For improved stability of the structure 2 on the panel 3, notches 31 are provided in an alternating manner on the flanges of the inner part 10 of the lateral wall structure 2 and of the half shell 28 of the wall part 11. At the locations of the notches 31, the flanges 23 resting on one another are now of three layers, and so a spot-welding process is unproblematical. Of course, notches 21 may also be formed on the flanges 23 of the outer half shell 27 (FIG. 5) or also of the panel 3, with the latter possibly being disadvantageous for visual reasons.

The invention claimed is:

1. A lateral wall module for the body of a motor vehicle, which extends to the rear in the longitudinal direction of the vehicle at least from an A-pillar as far as a rear wheel mounting, comprising:
   a lateral wall structure, and
   a lateral wall panel connected to the lateral wall structure, wherein the lateral wall structure is constructed from an inner part and a wall part fastened on an outside of the inner part, integrally reinforces the lateral wall module, and is at least partially designed in a sill region in such a manner that it complements the lateral wall panel,
   wherein the lateral wall panel is designed as a single-component pressed part which extends from the rear wheel mounting firstly over a lateral roof frame and the A-pillar as far as a front wall pillar and, secondly, over a sideboard as far as a box-section pillar, and
   wherein the box-section pillar runs as far as an upper edge of the sideboard.

2. The lateral wall module as claimed in claim 1, wherein the lateral wall panel and the lateral wall structure are designed in profile form as open loops having openings facing each other in an assembled state.

3. The lateral wall module as claimed in claim 1, wherein the wall part is a reinforcing wall part designed as a hollow profile in a shell-type construction.

4. The lateral wall module as claimed in claim 1, wherein at least one of the lateral wall structure and the lateral wall panel includes connecting flanges, and wherein, in the region of the connecting flanges, the wall part has notches in an alternating manner with the inner part of the lateral wall structure.

5. The lateral wall module as claimed in claim 2, wherein the wall part is a reinforcing wall part designed as a hollow profile in a shell-type construction.

6. The lateral wall module as claimed in claim 2, wherein at least one of the lateral wall structure and the lateral wall panel includes connecting flanges, and wherein, in the region of the connecting flanges, the wall part has notches in an alternating manner with the inner part of the lateral wall structure.

7. The lateral wall module as claimed in claim 3, wherein at least one of the lateral wall structure and the lateral wall panel includes connecting flanges, and wherein, in the region of the connecting flanges, the wall part has notches in an alternating manner with the inner part of the lateral wall structure.

8. The lateral wall module as claimed in claim 5, wherein at least one of the lateral wall structure and the lateral wall panel includes connecting flanges, and wherein, in the region of the connecting flanges, the wall part has notches in an alternating manner with the inner part of the lateral wall structure.

* * * * *